United States Patent [19]
Owaki et al.

[11] 4,105,213
[45] Aug. 8, 1978

[54] DEVICE FOR CUTTING A SOUND GROOVE ON A DISC RECORDING MEDIUM

[75] Inventors: Isao Owaki; Shinji Nakamura; Yoshiyuki Tsuchikane, all of Tokyo, Japan

[73] Assignee: Victor Company of Japan, Ltd., Yokohama, Japan

[21] Appl. No.: 729,669

[22] Filed: Oct. 5, 1976

[30] Foreign Application Priority Data

Oct. 15, 1975 [JP] Japan .............................. 50-139372[U]
Jan. 29, 1976 [JP] Japan ................................. 51-9069[U]

[51] Int. Cl.² .............................................. G11B 3/44
[52] U.S. Cl. .......................................... 274/38; 361/212
[58] Field of Search ................... 274/38; 361/212, 220

[56] References Cited

U.S. PATENT DOCUMENTS

| | | | |
|---|---|---|---|
| 2,572,426 | 10/1951 | Andrews | 274/38 |
| 3,813,101 | 5/1974 | Benz | 274/38 |
| 3,927,887 | 12/1975 | Oda et al. | 274/38 |
| 3,930,117 | 12/1975 | Clemens et al. | 274/38 |
| 3,945,902 | 3/1976 | Hawrylo et al. | 274/38 |

*Primary Examiner*—Steven L. Stephan

[57] ABSTRACT

A stylus for cutting a sound groove on a disc recording medium comprises a diamond body having a groove cutting part, for producing a chip cut from the disc recording medium. The stylus also includes a structure made of a material which does not readily generate static electricity when the chip is in sliding contact therewith. The non static electricity generating material is at a position on the cutting stylus body which is contacted by the chip.

5 Claims, 11 Drawing Figures

DEVICE FOR CUTTING A SOUND GROOVE ON A DISC RECORDING MEDIUM

BACKGROUND OF THE INVENTION

The present invention relates generally to devices for cutting sound grooves on a disc recording medium. More particularly, the device has excellent recording characteristics. Continuous chips, cut from the original record discs, are prevented from adhering to the groove, the cutting stylus, and other parts, since the static electricity generated during the cutting process is effectively discharged.

Sound signals are ordinarily recorded on an original record disc coated with an acetate or vinyl chloride base material, that is, a so-called "lacquer disc". Recording involves cutting a groove thereon by means of a device having a cutting stylus. As a material for this cutting stylus, sapphire has heretofore been used. However, a sapphire has a short serviceable life because it is not very hard and has a relatively rapid wear.

Accordingly, attempts have been made to use a harder diamond, in place of a sapphire, for the cutting stylus. The life of a diamond cutting stylus is undoubtedly very long, because of the hardness of diamond. However, it has been found that a diamond stylus generates more static electricity during recording than a sapphire generates, since diamond is a carbonaceous material. For a diamond stylus, different kinds of electrostatic charges accumulate on the confronting surfaces of the continuous chip and the cutting stylus and on the confronting surfaces of the chip and the groove after cutting. When such a great quantity of static electricity is generated, the resulting coulomb force causes the chip to adhere to the cutting stylus and the cut groove of the lacquer disc. It is difficult to remove this chip, even by means of a vacuum suction, which has been used heretofore.

When the chip adheres to the cutting stylus and the lacquer disc, the cutting function is impaired. For this reason, cutting styluses employing diamond tips have not been used heretofore.

Accordingly, in order to overcome the above described difficulties, we have previously described a cutting device having a grounded electroconductive material on the mirror surface of a diamond stylus, as disclosed in United States Patent Application, Ser. No. 659,027, entitled "DEVICE FOR CUTTING A SOUND GROOVE IN A DISC RECORDING MEDIUM", filed Feb. 18, 1976, now abandoned. In accordance with this previous cutting device, the chip produced at the time of cutting is guided into contact with the electroconductive material. The electrostatic charge accumulated on the chip escapes to ground by way of the electroconductive material, thereby preventing static electricity. However, this cutting device has a problem since the cutting stylus is grounded by way of the cutter head.

Accordingly, we have considered the principle by which static electricity is generated when two objects of different compositions come into mutual contact and then separate.

First, if the two objects contact each other a, transfer of charge carriers (which may be considered to be electrons or ions) occurs in conformance with the difference in the interfacial energies at the mutually contacting surfaces. As a result, an electrostatic potential difference is produced between the two objects. This electrostatic potential difference causes the charge carriers to travel between the two objects, without quantum dynamical energy loss. Charges of different kind and equal quantity accumulate, respectively, on the two objects. This transfer of the charges reaches an equilibrium state and thus end, after a time, in conformance with the properties of the objects.

If the two objects in mutual contact are separated, there is a reverse flow of one portion of the charge carriers, which have accumulated in conformance with the above mentioned electrostatic potential difference. A remainder portion of the charge carriers remains on their respective object. Furthermore, charge carriers may also escape by being discharged into the air through the objects since there is a rise in the potential on the charged parts, which rise accompanies the decrease in electrostatic capacitance which occurs when the objects separate.

Next to be considered is the generation of static electricity which occurs when an original record disc (lacquer disc) is cut by a diamond cutting stylus. This cutting of the lacquer disc may be regarded as a phenomenon wherein the contacting and separating of the chip cut from the lacquer disc and the cutting stylus is continuously repeated. The chip and the stylus have an electrostatic potential difference. Here, there is a great difference of the interfacial energy levels between the nitroacetate lacquer disc and the diamond cutting stylus. For this reason, a relatively large charge of static electricity is generated and stored on both the chip and the cutting stylus.

Furthermore, the quantity of frictional charge generated between two electrical insulators is proportional to the length of frictional movement. Since the chip slides a relatively long distance along the mirror surface of the cutting stylus, an even greater quantity of static electricity is generated on the chip, the cutting stylus, and related parts. For this reason, the chip produced by the cutting operation adheres to the cut groove and the cutting stylus. As a result, a good recording cannot be accomplished.

In view of the above considerations, we have reasoned that, in order to suppress the quantity of static electricity, generated at the time of cutting, on the chip and the diamond cutting stylus, the chip should slide over the shortest possible distance while in contact with the surface of the diamond cutting stylus. Moreover, the chip should be contacted and guided by a structure made of a material having an interfacial energy level which differs by a very small amount the energy level of the chip. That is, it should be a material which does not readily generate static electricity when the chip slides over it.

SUMMARY OF THE INVENTION

Accordingly, it is a general object of the present invention to provide a novel and useful device for cutting a sound groove on a disc recording medium, in which the above described problems have been solved.

Another and more specific object of the invention is to provide a device for cuttting a sound groove on a disc recording medium. The invention uses a structure made of a substance, such as a corundum, which does not readily generate static electricity. This substance is provided on the mirror surface of the diamond stylus proper. The chip cut from the original record disc comes into contact with and is guided by this structure, which does not readily generate static electricity. By this provision, static electricity is not readily generated when the chip is in sliding contact and frictional rubbing over the mirror surface of the cutting stylus proper. This prevents a static electric adhesion between the chip, the cut groove in the disc, the cutting stylus, and other parts.

Other objects and further features of the invention will be apparent from the following detailed description with respect to preferred embodiments of the invention when read in conjunction with the accompanying drawings.

BRIEF DESCRIPTION OF THE DRAWINGS

In the drawings, which are all shown on a greatly magnified scale.

DETAILED DESCRIPTION

Figure 1:
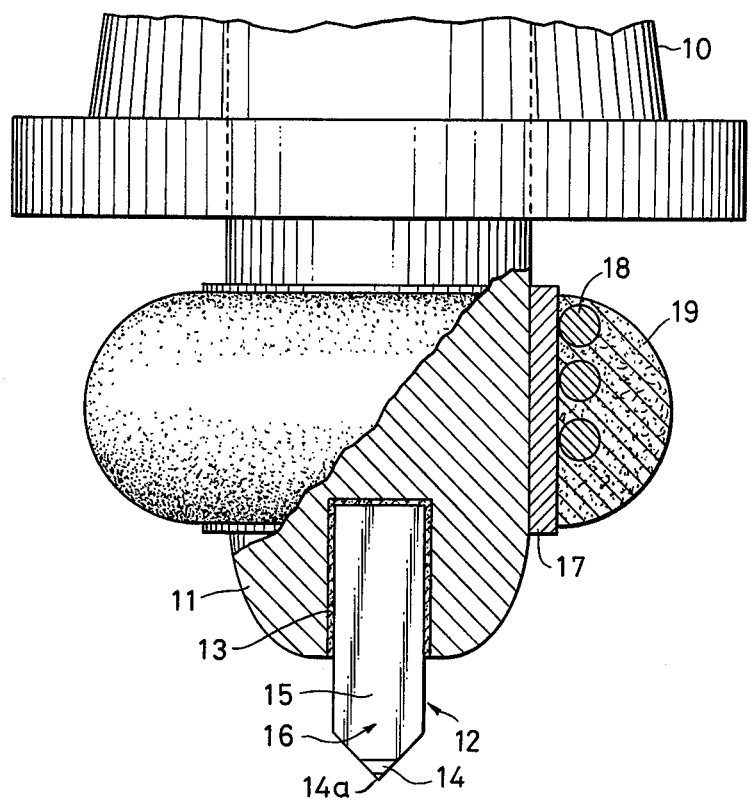
FIG. 1 is a front view, with some parts in cross section, showing a first embodiment for cutting a sound groove on a disc recording medium, according to the present invention.
Figure 2:
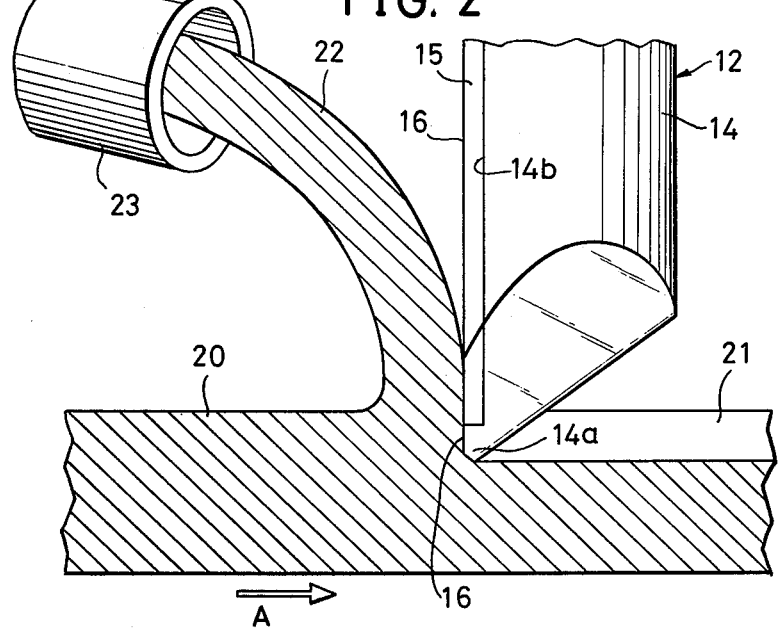
FIG. 2 is a side view showing essential parts in an operational state of the device illustrated in FIG. 1.

A first embodiment of a cutting device constituting the present invention is illustrated in FIGS. 1 and 2. An aluminum shank 10 is mounted on a cantilever of a cutter head of the cutting device for holding a titanium stylus supporting rod 11 which is inserted at its root end into the shank 10. The outer end of the stylus supporting rod 11 has a longitudinal central hole therein for receiving a cutting stylus 12 which is bonded thereto by an adhesive 13.

The 12 comprises a cutting stylus diamond body 14 having a thin sheet 15 of sapphire. The stylus body 14 has a recessed part 14b over almost all of its mirror surface, except for a cutting portion 14a at its extreme end. The thin sapphire sheet 15 is fitted into this recessed part 14b. The front faces of the thin sapphire sheet 15 and the cutting portion 14a lie in the same plane to form the mirror surface 16 of the cutting stylus.

The stylus supporting rod 11 is girdled by a sapphire ring 17 which is fitted thereon. A heater coil 18 is wound around the outer cylindrical surface of the sapphire ring 17, and the outer surfaces of the ring 17. The heater coil 18 is covered by a cement structure 19.

As shown in FIG. 2, the cutting portion 14a is cutting a lacquer disc 20 which rotates in the arrow direction A. Cutting is carried out by the mirror surface (cutting face) 16 of the cutting stylus 12 at the front surface in the advancing direction. In this cutting operation, an electrical signal is converted into a mechanical vibration by a driving system (not shown) which includes a driving coil. The vibrations are tranmitted by way of the cantilever, the shank 10, and the stylus supporting rod 11 to the cutting stylus 12. The cutting portion 14a of the stylus cuts and forms a cut groove 21 in a shape which conform to the signal to be recorded.

As this groove 21 forming proceeds, a chip 22 is produced from the disc 20. This chip 22 slides in rubbing contact across the mirror surface 16 of the cutting stylus 12, by which it is guided. Thereafter, it is removed by a suction nozzle 23 of a vacuum suction device.

Since the above described thin sheet 15 on the mirror surface of the stylus is made of sapphire, the mutual interfacial energies between this thin sheet 15 and the material (for example, nitroacetate) of the lacquer disc are substantially equal. As a consequence, there is only a small difference of electrostatic potentials between the thin sheet 15 and lacquer disc material. For this reason, almost no static electricity is generated on the chip 22 when it slides in rubbing contact against the outer surface of the sapphire thin sheet 15.

The chip 22 which is cut and formed by the cutting tip portion 14a of the stylus 14 comes into sliding contact with the thin sapphire sheet 15, immediately after it is cut and formed. Accordingly, only a small quantity of the static electricity which is generated at the time of cutting is charged onto the chip 22 almost no static electricity is generated by its sliding contact with the mirror surface 16. Therefore, the chip 22 is positively drawn away into the suction nozzle 23 and it does not adhere to the cut groove 21. Therefore, a good sound recording is accomplished by cutting.

The material of the thin sheet 15 is not limited to sapphire, which is one kind of corundum. It is possible to use other materials which have a relatively high hardness. Moreover, such material should exhibit a small difference of interfacial energy relative to the material of the original lacquer disc, such as nitroacetate (herein referred to as materials which do not readily generate static electricity). Examples of such materials are other corundum such as ruby, ceramics, and hard metallic materials such as ferrites, titanium carbide, and tungsten carbide. This possibility of using other materials for the thin sheet 15 is also applicable to the other embodiments of the invention, set forth hereinafter.

Figure 3A:
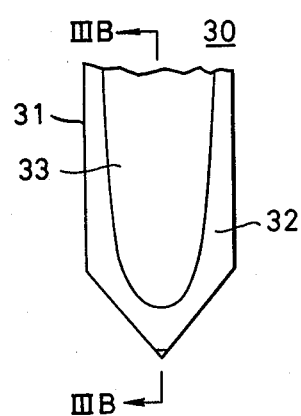
FIGS. 3A and 3B are respectively a front view and a side view, in longitudinal cross section (taken along the line IIIB—IIIB in FIG. 3A), showing a second embodiment of a cutting stylus.
Figure 3B:
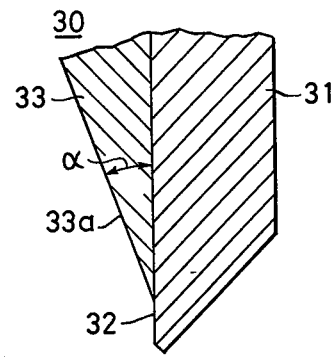

A second embodiment of the cutting stylus according to the invention is illustrated in FIGS. 3A and 3B. The cutting stylus 30 in this embodiment comprises a diamond cutting stylus body 31 and a material 33 which does not readily generate static electricity. This material 33 is bonded onto the mirror surface 32 of the cutting stylus body 31. The material 33 does not readily generate static electricity. It has a shape with a negative rake angle $\alpha$.

In accordance with the instant embodiment of the invention, there is no need to provide a recessed part in the cutting stylus body, as in the above described first embodiment. The production of the cutting device is thus facilitated. Furthermore, the chip cut by this stylus is guided by the front face 33a of the material 33 which does not readily generate static electricity. The chip is bent forward in the advance direction of the cutting stylus 30. The chip is thereby drawn positively into the suction nozzle. During this action, almost no electrostatic charge is generated by the chip when it comes into sliding contact with the material 33 which does not readily generate static electricity. This is similar to the preceding, first embodiment of the invention.

Figure 4A:
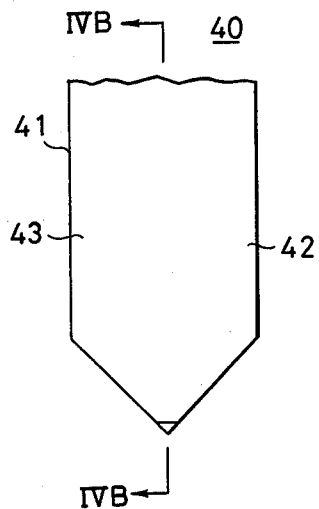
FIGS. 4A and 4B are respectively a front view and a side view, in longitudinal cross section (taken along the line IVB—IVB in FIG. 4A), showing a third embodiment of the cutting stylus.
Figure 4B:
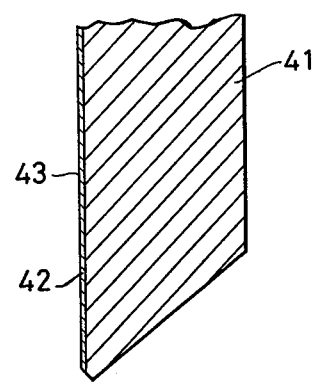

Another and third embodiment of the cutting stylus is illustrated in FIGS. 4A and 4B. This cutting stylus 40 comprises a diamond stylus body 41 and a film (or layer) 42 of a material which does not readily generate static electricity, such as a film of a hard metal which is secured as a covering on the front face (or mirror surface) of the stylus body 41. The front surface of the film (or layer) 42 of the material which does not readily generate static electricity constitutes a mirror surface 43 of the cutting stylus 40.

Figure 5:
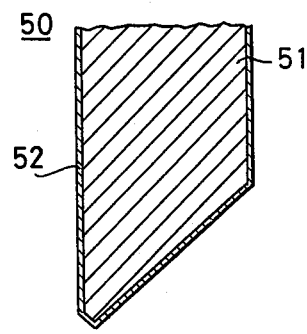
FIG. 5 is a side view in longitudinal cross section showing a fourth embodiment of a cutting stylus of the cutting device.

In a fourth embodiment of the invention (FIG. 5), the cutting stylus 50 comprises a diamond stylus body 51 and a film (or layer) 52 of a material which does not readily generate static electricity such a metal film covering substantially the entire outer surface of the cutting stylus body 51. The film is formed by a process such as vacuum evaporation, depositing, or sputtering. As a result of a large number of cutting operations, the film 52 of the material which does not readily generate static electricity, becomes worn, and only the cutting part of the stylus body 51 becomes exposed. No problem arises.

A feature of the construction in each of the above described embodiments is that the structure of the material which does not readily generate static electricity covers almost the entire mirror surface of the cutting stylus. This feature is not necessary in all cases however. The structure of the material which does not readily generate static electricity may be secured to only that part of the mirror surface where the chip comes into sliding contact, as in the embodiments of the invention described below.

Figure 6A:
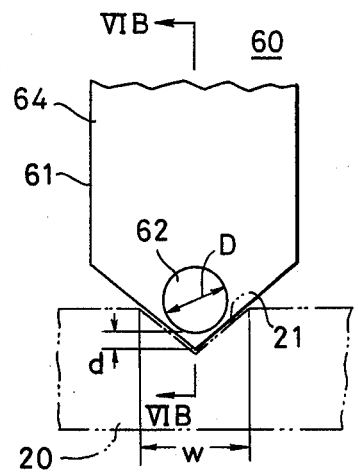
FIGS. 6A and 6B are respectively a front view and a side view, in longitudinal cross section (taken along the line VIB—VIB in FIG. 6A), showing a fifth embodiment of the cutting stylus.
Figure 6B:
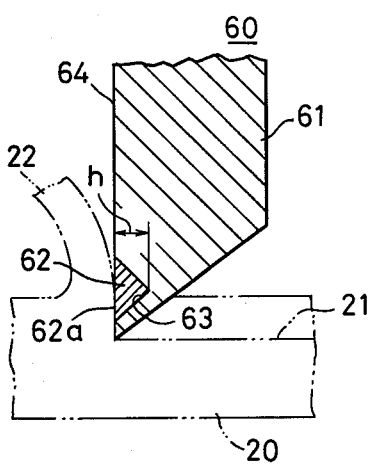

In a fifth embodiment of the invention as illustrated in FIGS. 6A and 6B, the cutting stylus 60 comprises a diamond stylus body 61 and a small sapphire insert 62. Near the extreme end of the cutting stylus body 61, a conical cavity 63 is formed in the stylus body by a suitable process such as laser machining or mechanical machining. The small sapphire insert 62 of conical shape is embedded in this cavity 63. The cutting stylus 60 is then finished by grinding, so that the mirror surface 64 of the cutting stylus body 61 and the front face 62a of the small sapphire insert 62 will lie in the same plane.

Each portion of the continuously flowing chip 22 makes contact with the front face 62a of the small sapphire insert 62. Thereafter, it separates and moves away from the cutting stylus 60. It is sufficient to provide the small sapphire insert in only the part of the surface 62a, so that the sapphire functions as a material which does not readily generate static electricity.

In the instant embodiment of the invention, an example of significant dimentions are: a cut groove width w of 70μm; a distance d between the cutting tip of the stylus body and the part nearest thereto of the small sapphire insert 62 of 20μm, a diameter of the small sapphire insert 62 of 40μm, and a height h of the small sapphire insert 62 (depth of the cavity 63) of 35μm.

Figure 7A:
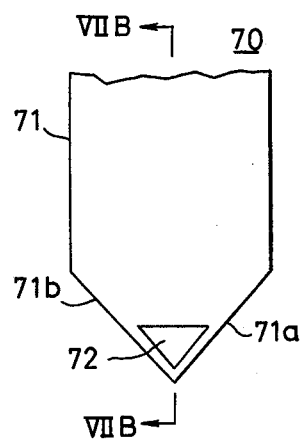
FIGS. 7A and 7B are respectively a front view and a side view, in longitudinal cross section (taken along the line VIIB—VIIB in FIG. 7A), showing a sixth embodiment of the cutting stylus.
Figure 7B:
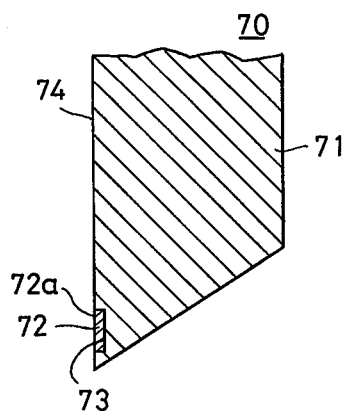

Still another embodiment of the cutting stylus constitutes a sixth embodiment of the invention, as illustrated in FIGS. 7A and 7B. The cutting stylus 70 comprises a diamond stylus body 71 and a small sapphire insert 72. A triangular cavity 73 is formed in the stylus body 71 near its extreme end. The small sapphire insert 72, in the shape of a triangular plate, is embedded in this triangular cavity 73. Two sides of each of the small sapphire insert 72 and the cavity 73 are respectively parallel to the burnishing surfaces 71a and 71b on both sides of the stylus body 71. The mirror surface 74 of the stylus body 71 and the outer front surface 72a of the small sapphire insert 72 are finished by grinding, so as to lie in the same plane. Since the small sapphire insert 72 is in the shape of an inverted triangle, in the instant embodiment of the invention, the distance between the extreme rod of the cutting stylus body 71 and the small sapphire insert 72 can be made less than that in the preceding embodiment of the invention.

Further, this invention is not limited to these embodiments but various modifications may be made without departing from the scope and spirit of the invention.

What is claimed is:

1. A device for cutting a sound groove on a disc recording medium comprising a diamond stylus body having a part for cutting a groove on said disc recording medium, thereby producing a chip cut from said disc recording medium, and nonconductive means made of a material which does not readily generate static electricity so that it does not readily generate static electricity when said chip is in sliding contact therewith, said nonconductive means being mounted on a mirror cutting surface of said stylus body at a position where it makes contact with said chip.

2. A device for cutting a disc recording medium as claimed in claim 1 in which said nonconductive material which does not readily generate static electricity is a material selected from the group consisting of sapphire, ruby, and the like corundums.

3. A device for cutting a disc recording medium as claimed in claim 1 in which said nonconductive material which does not readily generate static electricity is on a mirror cutting surface of said stylus body at a localized position which is slightly separated from an extremity by a distance so that it is on only a part which is slidingly contacted by said chip.

4. A device for cutting a disc recording medium comprising a diamond stylus body having a part for cutting a groove on said disc recording medium, thereby producing a chip cut from said disc recording medium, nonconductive means made of a material which does not readily generate static electricity so that it does not readily generate static electricity so that it does not readily generate static electricity when said chip is in sliding contact therewith, said nonconductive means being mounted on said stylus body at a position where it makes contact with said chip, in which said nonconductive material which does not readily generate static electricity is on a mirror cutting surface of said stylus body at a localized position which is slightly separated from an extremity by a distance so that it is on only a part which is slidingly contacted by said chip, in which said stylus body has a cavity formed therein at a position in the vicinity of said extremity, and said material which does not readily generate static electricity is embedded in said cavity in a manner such that the outer surface of said material lies in the same plane as the mirror surface of said stylus body.

5. A device for cutting a disc recording medium as claimed in claim 4 in which both said cavity and said material which does not readily generate static electricity has a triangular shape having two sides which are respectively parallel to burnishing surfaces of said stylus body.

* * * * *